(12) United States Patent
Demerville et al.

(10) Patent No.: US 7,286,555 B2
(45) Date of Patent: Oct. 23, 2007

(54) METHOD FOR ALLOCATING RESOURCES IN THE UPLINK OF A WIRELESS COMMUNICATION NETWORK AND CORRESPONDING RADIO TERMINAL

(75) Inventors: Laurent Demerville, Paris (FR); Jerome Brouet, Paris (FR)

(73) Assignee: Alcatel, Paris (FR)

( * ) Notice: Subject to any disclaimer, the term of this patent is extended or adjusted under 35 U.S.C. 154(b) by 959 days.

(21) Appl. No.: 10/145,744

(22) Filed: May 16, 2002

(65) Prior Publication Data
US 2002/0176439 A1 Nov. 28, 2002

(30) Foreign Application Priority Data
May 25, 2001 (EP) ................................. 01440144

(51) Int. Cl.
*H04B 7/212* (2006.01)
*H04L 12/43* (2006.01)
*H04Q 7/20* (2006.01)

(52) U.S. Cl. ................... 370/442; 370/458; 455/450
(58) Field of Classification Search .............. None
See application file for complete search history.

(56) References Cited

U.S. PATENT DOCUMENTS 6,081,536 A 6/2000 Gorsuch et al.
6,359,898 B1* 3/2002 Cudak et al. ............... 370/442
6,671,511 B1* 12/2003 Forssell et al. ........... 455/452.1
6,718,179 B1* 4/2004 Forssell et al. ............. 455/509
2002/0093953 A1* 7/2002 Naim et al. ................. 370/386

FOREIGN PATENT DOCUMENTS

EP 1 006 695 A1 6/2000
EP 1 043 902 A2 10/2000

* cited by examiner

*Primary Examiner*—Huy D. Vu
*Assistant Examiner*—Clemence Han
(74) *Attorney, Agent, or Firm*—Sughrue Mion, PLLC

(57) ABSTRACT

The invention relates to a method of allocating resources in the uplink of a wireless communication network supporting real-time packet data services by utilizing a centralized resource allocation module and a plurality of radio terminals. The method includes generating data blocks at the radio terminals and transmitting them as frames to the resource allocation module. The frames include an indication of the number of data blocks stored in a data queue of the radio terminal and the number of data blocks being generated by the data block source. The resource allocation module allocates resources to each radio terminal based on the indication transmitted by each radio terminal.

6 Claims, 2 Drawing Sheets

METHOD FOR ALLOCATING RESOURCES IN THE UPLINK OF A WIRELESS COMMUNICATION NETWORK AND CORRESPONDING RADIO TERMINAL

BACKGROUND OF THE INVENTION

The present invention relates to radio communication and more precisely to a method for allocating resources in the uplink of a wireless communication network supporting real-time packet data services.

In wireless communication networks, resource allocation for traffic data may be performed by a centralized resource allocation module. This is especially the case in GPRS (General Packet Data Services) or EDGE (Enhanced Data rate for GSM Evolution) networks.

Usually, a radio terminal which has traffic data to send requires the allocation of resources to the centralized resource allocation module. The latter, by taking into account a plurality of resource allocation requests from different mobile users and specific parameters contained in the resource allocation request message (i.e. user type) allocates resources to the mobile users.

The general term resources should be understood in the framework of the present invention as radio resources i.e. either a frequency channel and/or a time slot of a frame that is/are reserved for a radio terminal to communicate with the wireless radio network. Frequency channels, respectively time slots, are usually resources used in FDMA, respectively TDMA networks. A resource can be a code in CDMA networks, it may also be a combination of frequency channel, time slot and code.

The present invention deals especially with packet-oriented wireless communication networks which support real-time data services. Such real time data services may consist in the transmission of packetized voice or video. Such real-time data services require that the transmission delay and the delay between the reception of two consecutive data frames are bounded for ensuring an acceptable quality of service. These strict requirements are sometimes difficult to fulfill since the resource allocation module cannot react as fast as necessary on each resource allocation request message.

Moreover, if the wireless communication network supports simultaneously real-time and non real time data services, the resource allocation module is even more demanded.

Several solutions can improve the resource allocation mechanism in wireless communication networks supporting real-time data services.

For example, a combination of circuit-oriented resource allocation and packet-oriented resource allocation helps the real-time requirements to be fulfilled. Upon reception of a resource allocation request message from a radio terminal having real-time data to transmit, the resource allocation module grants resources for a predefine time period or for a predefined number of real-time data frames.

A such mechanism is, for example, described in the ETSI standard GSM 04.60 and implemented by means of Temporary Block Flow (TBF). A temporary block flow is a physical connection between a transmitter and a receiver of the wireless communication network supporting the unidirectional transfer of a predefined number of layer-2 frames on traffic channels. A TBF is opened by the resource allocation module upon receipt of a "packet channel request" message from a radio terminal. Before the termination of the TBF, the radio terminal may send a further "packet channel request message if further layer-2 frames should be transmitted. In such a case, the resource allocation can be performed right on time so that there is no delay between the termination of one TBF and the opening of a further TBF.

A further mechanism is provided for in order to better estimate when a TBF should terminate and then further optimize the resource allocation. This mechanism, called countdown procedure, consists in indicating in a field of the header of each layer-2 frame, short before the termination of the TBF the exact number of layer-2 frames, the countdown value, which remain to be sent before the termination of the TBF. The countdown value is decremented each time a new frame is transmitted on the radio interface.

The countdown procedure is especially appropriate for acknowledged non-real time packet data service where lost or badly received frames are retransmitted. When a frame has to be retransmitted, the countdown value is not decremented. The transmitter alone knows if a frame is retransmitted and informs the resource allocation module of such a situation by not decreasing the countdown value.

On the contrary, the unacknowledged mode is used for real-time packet data services i.e. lost or badly received frames are not retransmitted at the initiative of the layer 2 protocol in order not to delay the whole transmission by retransmitting frames. The correction or compensation of lost or badly received frames is dealt with at higher protocol levels. To this extend the countdown procedure does not improve the resource allocation for real time packet data services.

A particular object of the present invention is to provide a method for optimizing the resource allocation procedure for real-time packet data services.

Another object of the invention is to provide a radio terminal and a resource allocation module implementing a such method.

SUMMARY OF THE INVENTION

These objects, and others that appear below, are achieved by a method for allocating resources in the uplink of a wireless communication network supporting real-time packet data services, the wireless communication network comprising a centralized resource allocation module and a plurality of radio terminals, the method comprising the steps of:

generating and storing real-time data blocks at the radio terminals;

generating and storing frames encapsulating real-time data blocks or portions of real-time data block at the radio terminals;

including in each of the frames generated by the radio terminal an indication on the number of stored real-time data blocks;

transmitting the frames in the uplink of the wireless communication network upon authorization from the resource allocation module, forwarding said indication to the centralized resource allocation module; and allocating resource to the radio terminal depending on the indication.

These objects are also attained by a radio terminal to be used in a wireless communication network supporting real-time packet data services, the radio terminal comprising a data block source associated to a data block queue for generating and storing real-time data blocks and a frame generator associated to a frame queue for generating and storing frames encapsulating real-time data blocks or portions of real-time data block, the frames being transmitted in the uplink of the wireless communication network upon authorization from a resource allocation module, wherein the radio terminal further comprising:

a counting module for generating an indication on the number of stored real-time data blocks at the first module;

an interface between the counting module and the second module for forwarding the indication to the second module;

a frame generator for including the indication in each frame transmitted by the radio terminal.

These objects are also attained by a resource allocation module to be used a wireless communication network supporting real-time packet data services for allocating resources in the uplink to radio terminals, the resource allocation module sending authorization to transmit frames, the frames comprising real time data blocks or portions of real time data blocks, the resource allocation module comprising:

a storage medium for storing an indication on the number of stored real-time data blocks at each of the radio terminals;

processing unit for determining the amount of resources to be allocated to each of the radio terminals depending on the indication.

According to the present invention, a distinction is made between the step of generating and storing real-time data block and the step of generating, storing and transmitting frames encapsulating real time data blocks corresponding to a layer-two protocol. According to the invention, each frame comprises an indication destined to the resource allocation module on the number of stored real time data blocks waiting for transmission.

The present invention has the advantage to give to the resource allocation module an upstream indication which reflects the behavior of the real-time data block source and not the behavior of the layer-2 frame buffer as known in prior art. This indication better takes in consideration the characteristics of the real-time data blocks source and provides to the resource allocation module with a faster reactivity. As a consequence, the method according to the present invention contributes to optimize the number of simultaneous mobile users on the radio link and better ensures real time requirements for voice or video traffic.

In a preferred embodiment, this method is used in relation with the radio link control protocol RLC as specified in ETSI GSM04.60, the indication on the number of stored real time data blocks being contained in the Countdown Value field of the RLC frame header. This method is preferably used in GPRS (General Packet Data Services) or EDGE (Enhanced Data rate for GSM Evolution) networks.

Further advantageous features of the invention are defined in the dependent claims.

This invention is based on a priority application EP 01 44 0144 which is hereby incorporated by reference.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

Figure 1:
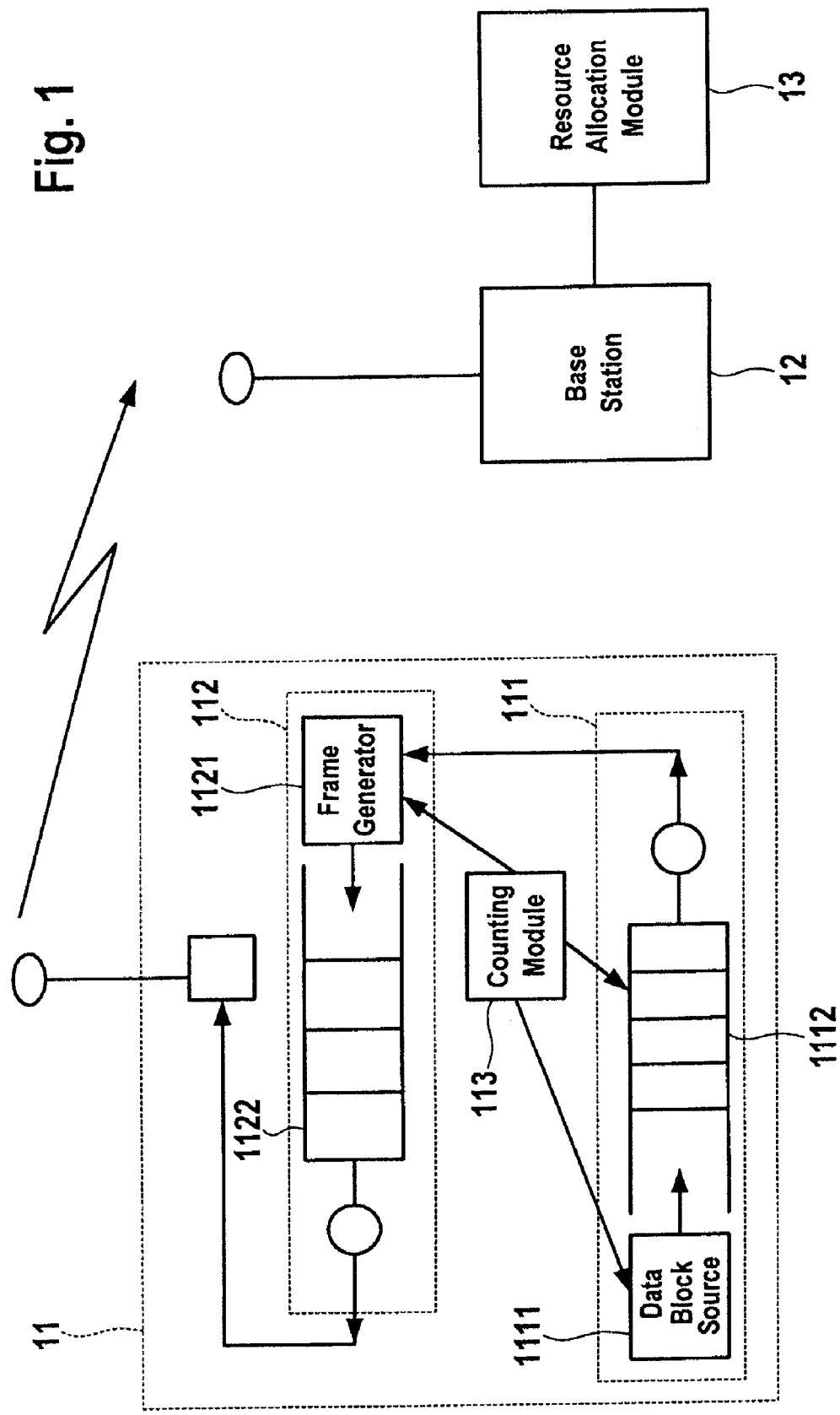
FIG. 1 shows a simplified radio communication system where the method according to the present invention can be used.

FIG. 1 represents a simplified radio communication system where the method according to the present invention can be used. The radio communication system comprises a radio terminal 11, a radio communication channel, a base station 12 connected to a centralized resource allocation module 13.

The simplified radio communication network is preferably a GERAN (GSM/EDGE Radio Access Network) functioning in a packet switched mode supporting real time services as voice or video services.

According to the present invention, radio terminal 11 comprises a first module 111 for generating and storing real time data blocks. First module 111 comprises a real time data block source 1111 and a real time data block queue 1112. The real time data blocks contains preferably packetized voice or video data.

First module 111 is connected to a second module 112 for generating and storing frames encapsulating real time data blocks or portions of real time data blocks. Second module 112 comprises a frame generator 1121 and a frame queue 1122. The output of frame queue 1122 is connected to a transmission module which transmit frames on the radio interface upon reception of a transmit authorization from resource allocation module 13. Second module 112 supports a layer-2 communication protocol which deals with the transmission of layer 2 frames encapsulating real time data blocks.

According to the present invention, radio terminal 11 further comprises a counting module 113 for counting the number of real time data blocks waiting for transmission in real time data block queue 1112. Counting module 113 forwards to an indication on the number of real time data block to frame generator 1121. This indication is preferably included in a field of each frame header generated at frame generator 1121.

The size of this field can be chosen arbitrary. A mapping should be established between the number of real time data blocks waiting for transmission and the indication on the number of real time data blocks contained in the header field. It may be a one to one mapping or any more appropriate mapping as will be immediately clear for a person skilled in the art.

Upon reception of a frame from radio terminal 11 at base station 12, the header of the frame is extracted an the indication on the number of real time data blocks waiting for transmission at first module 111 is forwarded to resource management module 13.

In a preferred embodiment, second module 112 supports, as layer-2 communication protocol, the Radio Link Control Protocol as specified in the standard ETSI GSM04.60. This protocol is preferably used in the unacknowledged mode to be able to fulfill real time constraints. Preferably, the field Countdown Value specified in the in the standard ETSI GSM04.60 is used for carrying the indication on the number of real time data blocks waiting for transmission at first module 111. The Countdown Value field as specified in the standard ETSI GSM04.60 comprises four bits and can as a consequence take 16 different values.

However, any other field of the frame header may be chosen to carry the indication provided that the position of this field is predefined and known at the radio terminal as well as at the radio network entity dedicated to extract the indication out of the header.

Preferably, the choice of the unacknowledged mode of transmission unambiguously indicates that the field Countdown Value contains the number of real-time packet blocks according to the present invention.

In a further embodiment of the present invention, counting module 113 also takes into account the number of real time data blocks being currently generated at the real time data block source 1111. This has the advantage to better anticipate the sudden generation of real time data blocks. In this embodiment, counting module adds the number of real time data blocks currently being generated at source 1111 and the number of data blocks stored at queue 1112. A weighting factor may be applied to the real time data blocks currently being generated at data block source 1111. Preferably, this weighting factor should be smaller than one.

Alternatively, some values may be assigned to specific configurations of the real time data block queue 1112. For example a predefined value may indicate the real time data block queue 1112 is empty but that a real time data block is being constructed at the real time data block source 1111. Another predefined value may indicate that the real time data block queue 1112 is empty and no real time data block is under construction at real time data block source 1111 i.e. that the corresponding radio terminal has entered a silence period.

Figure 2:
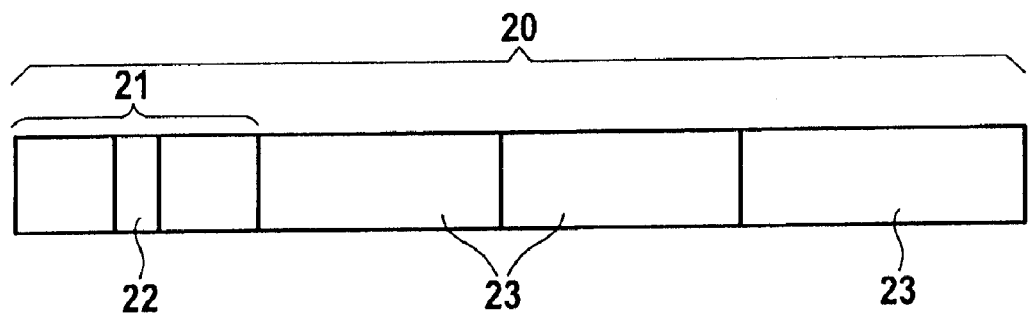
FIG. 2 shows an header of a frame according to the present invention.

FIG. 2 represents a frame header containing an indication according to the present invention.

A frame 20 as generated by frame generator 1121 comprises in header 21 a field 22 containing an indication on the number of real time data blocks waiting for transmission at first module 111 and a payload field containing several real time data blocks 23 or portions of real time data blocks. This frame should be transmitted upon reception of a transmit authorization received at radio terminal 11 from resource allocation module 13. The format of this frame is determined by the layer 2 protocol used on the radio interface in a preferred embodiment, the format of the frame is given by the RLC protocol as specified in ETSI GSM04.60.

Figure 3:
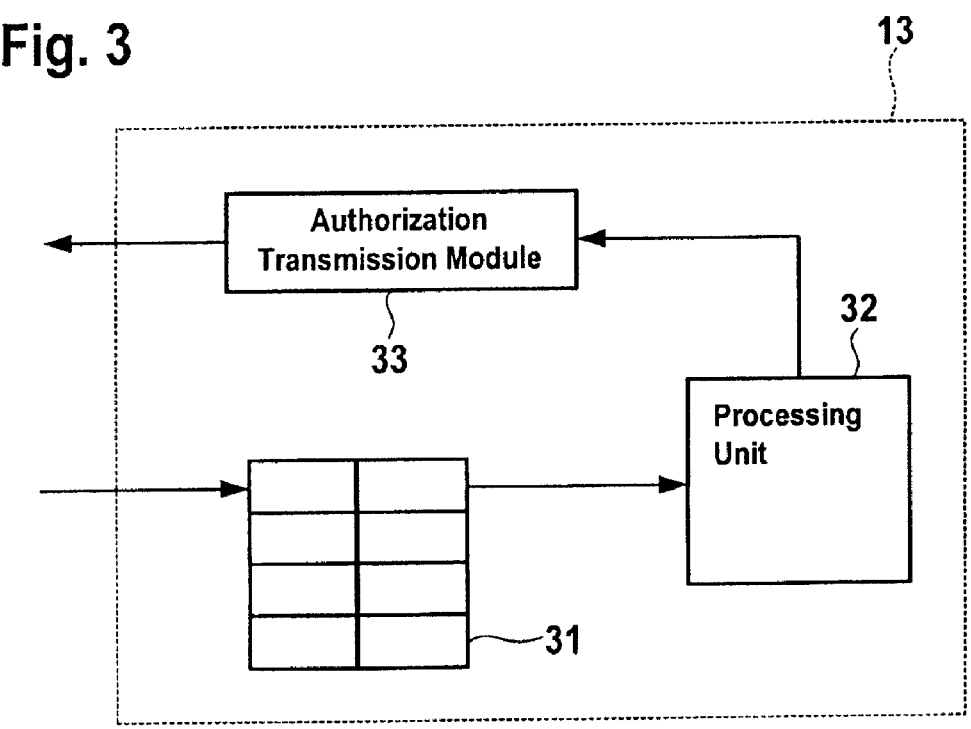
FIG. 3 illustrates an embodiment of the resource allocation module according to the present invention.

FIG. 3 shows an embodiment of a resource allocation module 13 according to the present invention.

Resource allocation module 13 comprises a storage medium 31 connected to a processing unit 32 which is further connected to a authorization transmission module 33.

Storage medium 31 is preferably organized in the form of a table containing as many entries as radio terminals connected to the radio communication network. Each entry contains a field corresponding to an identifier of the radio terminal and a field corresponding to an indication on the number of real time data blocks waiting for transmission at the corresponding radio terminal. Further fields corresponding to the usual parameters required at the resource allocation module 13 for determining the priority of each radio terminal to send frames should or may be contained in storage medium 31. These fields will not be further detailed in the framework of this invention but are well known for a person skilled in the art.

The field containing an indication on the number of real time data blocks waiting for transmission at radio terminal 11 is filled each time the base station receives a frame from this radio terminal. The indication on the number of real-time data blocks contained in the header of the frame is extracted and copied to the corresponding field in the storage medium 31 at resource allocation module. The extraction of the indication may be performed at any other entity of the radio communication network, for example at the base station, the RNC or at the resource allocation module itself.

The processing unit 32 is dedicated to calculate the priority of the different radio terminals to transmit frames on the radio interface according to a predefined, usually complex, algorithm. The usual algorithms used in the state of the art should be modified to take into account the features of the present invention. The algorithm should take into account the indication on the number of real time data blocks waiting for transmission at the first module 111 of each radio terminal.

Preferably, if this number is higher than a predefined threshold, the corresponding terminal should be given a higher transmit priority. A corrective term corresponding to the number of real time data blocks waiting for transmission at the first module of the corresponding radio terminal should weight with a predefined weighting factor the term used in prior art resource allocation algorithm.

Other ways to take into account the indication of the number of real time data blocks in the resource allocation algorithm will be clear for a person skilled in the art.

Usually, a transmit authorization is generated for each time slot by authorization transmission module 33 and transmitted on a predefined broadcast channel to the radio terminals. Other ways to the transmit authorizations to the radio terminals may be envisaged having no influence on the method according to the present invention.

The method according to the present invention helps to fulfill the real time requirements of real time data flows in that it enables the resource allocation module to take into account traffic which are not already registered in the layer 2 protocol since the real time data blocks not already encapsulated in layer 2 frames cannot be taken into account with usual prior art methods. Moreover, the method according to the present invention improves also the capacity of the radio network since the optimized resource allocation enables the network to accept more simultaneous users i.e. increases the spectrum efficiency of the radio communication network.

The invention claimed is:

1. A method for allocating resources in the uplink of a wireless communication network supporting real-time packet data services, said wireless communication network comprising a centralized resource allocation module and a plurality of radio terminals, said method comprising:

generating and storing real-time data blocks at said plurality of radio terminals;

generating and storing frames encapsulating real-time data blocks or portions of real-time data block at said radio terminals;

including in each of said frames generated by each radio terminal among said plurality of radio terminals an indication on the number of stored real-time data blocks;

transmitting said frames in the uplink of said wireless communication network upon authorization from said centralized resource allocation module, forwarding said indication to said centralized resource allocation module; and allocating at least one resource to said radio terminal depending on said indication, wherein the indication on the number of stored real-time data blocks includes, for each frame, a number of the real-time data blocks that are currently stored in a data block queue of the radio terminal added to a number of the real-time data blocks that are currently being generated by the radio terminals, wherein in the including the indication on the number of stored real-time data blocks, a weighting factor of less than one is applied to the number of the real-time data blocks that are currently being generated such that the number of the real-time data blocks that are currently stored in the queue are weighted more heavily than the number of the real-time data blocks that are currently being generated.

2. The method according to claim 1, wherein said frames are generated and transmitted according to a layer-two radio link protocol, the header of said frames comprising a field containing said indication.

3. The method according to claim 2, wherein said layer-two radio link protocol is the Radio Link Control (RLC) protocol as specified in ETSI GSM04.60, said indication being located in the Countdown Value field of the RLC frame header.

4. The method according to claim 1, wherein said real-time data blocks contain packetized voice.

5. A radio terminal to be used in a wireless communication network supporting real-time packet data services, said radio terminal comprising a data block source associated to a data block queue for generating and storing real-time data blocks and a frame generator associated to a frame queue for generating and storing frames encapsulating real-time data blocks or portions of real-time data block, said frames being transmitted in the uplink of said wireless communication network upon authorization from a resource allocation module, said radio terminal further comprising:
a counting module for generating an indication on the number of stored real-time data blocks at a first module;
an interface between said counting module and a second module for forwarding said indication to said second module;
a frame generator for including said indication in each frame transmitted by said radio terminal,
wherein the indication on the number of stored real-time data blocks includes, for each frame, a number of the real-time data blocks that are currently stored in the data block queue of the radio terminal added to a number of the real-time data blocks that are currently being generated by the radio terminals,
wherein the counting module generates the indication on the number of stored real-time data blocks such that a weighting factor of less than one is applied to the number of the real-time data blocks that are currently being generated, wherein the number of the real-time data blocks that are currently stored in the queue are weighted more heavily than the number of the real-time data blocks that are currently being generated.

6. A resource allocation module to be used a wireless communication network supporting real-time packet data services for allocating resources in the uplink to a plurality of radio terminals, said resource allocation module sending authorization to transmit frames, said frames comprising real-time data blocks or portions of real-time data blocks, said resource allocation module comprising:
a storage medium for storing an indication on the number of stored real-time data blocks at each of said radio terminals;
processing unit for determining the amount of resources to be allocated to each of said radio terminals depending on said indication,
wherein the indication that is stored by the storage medium of the resource allocation module includes, for each frame, a number of the real-time data blocks that are currently stored in a data block queue of a radio terminal among said plurality of radio terminals added to a number of the real-time data blocks that are currently being generated by the radio terminal,
wherein the indication on the number of stored real-time data blocks, which is stored by the storage medium, is weighted such that a weighting factor of less than one is applied to the number of the real-time data blocks that are currently being generated, wherein the number of the real-time data blocks that are currently stored in the queue are weighted more heavily than the number of the real-time data blocks that are currently being generated.

* * * * *